United States Patent
Lee et al.

(10) Patent No.: US 6,785,245 B1
(45) Date of Patent: Aug. 31, 2004

(54) METHOD AND APPARATUS FOR CONTROLLING FANOUT OF A MULTICAST TREE

(75) Inventors: Cheng Y. Lee, Ottawa (CA); Nabil Seddigh, North Gower (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/422,106

(22) Filed: Oct. 20, 1999

(51) Int. Cl.[7] .............................................. H04L 12/28
(52) U.S. Cl. ...................... 370/256; 370/390; 370/400; 370/408
(58) Field of Search ................................. 370/254–256, 370/351, 400–401, 390, 392, 408; 709/225–226, 238

(56) References Cited

U.S. PATENT DOCUMENTS

| | | | | |
|---|---|---|---|---|
| 5,634,011 A | * | 5/1997 | Auerbach et al. | 709/242 |
| 5,825,772 A | * | 10/1998 | Dobbins et al. | 370/396 |
| 5,831,975 A | * | 11/1998 | Chen et al. | 370/256 |
| 5,835,723 A | * | 11/1998 | Andrews et al. | 395/200.56 |
| 5,940,391 A | * | 8/1999 | Malkin et al. | 370/390 |
| 6,185,698 B1 | * | 2/2001 | Wesley et al. | 425/304 |
| 6,487,170 B1 | * | 11/2002 | Chen et al. | 370/231 |

* cited by examiner

Primary Examiner—Andy Lee
(74) Attorney, Agent, or Firm—Max R. Wood; Ogilvy Renault

(57) ABSTRACT

A method as apparatus for controlling the number of egress points at an ingress node in a multicast tree in a differentiated services network is described. A resource management entity is provided in each edge node in the entity. The resource management entity in the ingress node stores data from a service level specification that specifies the bandwidth, type of service and a limit on the number of egress points that can be grafted to the ingress node. The grafting of egress points to the node is controlled by the limit. If a new egress point cannot be grafted to the ingress node, the downstream node requesting the graft is preferably provided with graft redirect options to permit the downstream node to graft to an existing branch of the multicast tree. The advantage is automated, dynamic control of the multicast tree so that service is delivered in accordance with a service level agreement that governs service delivery for the dynamic multicast tree.

35 Claims, 3 Drawing Sheets

METHOD AND APPARATUS FOR CONTROLLING FANOUT OF A MULTICAST TREE

CROSS-REFERENCE TO RELATED APPLICATIONS

This is the first application filed for the present invention.

MICROFICHE APPENDIX

Not applicable.

TECHNICAL FIELD

The present invention relates to multicast services, and in particular to a method and apparatus for controlling fanout at an egress node of a dynamic multicast tree in a differentiated services (DS) network.

BACKGROUND OF THE INVENTION

The recent evolution of communication networks (e.g. the Internet) has increased demand for delivery of dynamic interactive or selective-use differentiated services.

Multicast services include, for example, news or entertainment content, video conferencing for long distance education, or video conferencing for personal or business differentiated services. In this context, a source may be a server at the network edge serving as a source of the content; or an edge node serving as a gateway between affiliated sub-networks, through which the content (which originates elsewhere) is supplied to the sub-network. Similarly, a sink node may be an end-user'communication device (e.g. a personal computer (PC) connected to the network via a modem); or an edge node which serves as a gateway between affiliated sub-networks, and through which the content (having been transported across the sub-network from the source) is supplied to an adjacent sub-network.

In order to enable multicast transport of content, a network provider (NP) must provision the network with both physical and service resources having sufficient band-width capacity. Physical resources are provisioned by installation of the physical plant used to construct the network fabric. Since changes in the physical resources necessarily involves the installation of new hardware, such changes are expensive, and consequently infrequent. Network providers typically utilize various known methods for predicting future bandwidth capacity requirements, and attempt to deploy physical plant having sufficient bandwidth capacity to satisfy anticipated growth in demand for forecast service offerings. However, at least during any specific multicast session, the available physical resources are static, and these may be allocated (typically by allocation of bandwidth and buffers) to multiple differentiated services sessions (or data transport paths) up to a practical limit of the band-width capacity of the physical resource.

The allocation of resources for any communication session is normally conducted during setup of a data transport connection across the network. Various methods are known for service resource allocation, such as, for example, Resource Reservation Protocol (RSVP) and Constrained Routing-Label Distributed Protocol (CR-LDP). In each case, an end-to-end path across the network between source and receiver nodes is first negotiated, and then transport resources along the path are allocated in accordance with a service level specification (SLS) of the communication session. In a situation where the allocation of resources to satisfy the SLS exhausts (or exceeds) the practical capacity of any element (e.g. a node or link) in the path (given pre-existing resource allocations for other differentiated services sessions already utilizing that element), then the path must be abandoned and a new path setup over less congested network elements.

Prior service resource allocation methods are well suited to unicast, and point-to-point (i.e. 1-to-1) connections across the network. In such cases, it is a simple matter to set up a path and allocate resources during setup of the connection. These methods can also be used effectively for multicast groups in which ingress and egress nodes are predetermined and static (i.e. 1-to-Many, in which all egress nodes are predetermined and static) because resource requirements can be accurately predicted prior to setting up the multicast tree. However, in cases where a multicast group is dynamic (i.e. in which any node of the network may serve as an egress node, and/or new egress nodes may join or leave the group during a multicast session), service resources of the network must be provisioned to provide for "1-to-Any" distribution, and it is very difficult to predict provisioning requirements a priori.

In order to overcome this problem Applicant invented a method and system for provisioning network resources for dynamic multicast groups which is described in a Patent Application entitled METHOD AND SYSTEM FOR PROVISIONING NETWORK RESOURCES FOR DYNAMIC MULTICAST GROUPS, issued as U.S. Pat. No. 6,556,544 on Apr. 29, 2003, and is incorporated herein by reference.

Although Applicant'copending patent application addresses the problem of dynamically provisioning a differentiated services network for a dynamic multicast tree, there exists a further multicast provisioning problem that has to date remained unaddressed. That problem is the control of the number of egress points at an ingress node of a dynamic multicast tree. Such control is commonly referred to as the control of "fanout" at the ingress node.

Since an ingress node in a multicast tree has a predetermined bandwidth capacity allocated to any given multicast session, egress points cannot be grafted to the ingress node without regulation. Otherwise, service levels will suffer and the multicast session is likely to intrude on the resources of other services. Egress point grafting to an ingress node of a dynamic multicast tree is not easily controlled, however. The problem is complicated by the dynamic nature of the multicast tree and the unpredictability of how many branches will be required and where the branches are likely to grow.

Consequently, there exists a need for a method and apparatus to permit the control of fanout at an ingress node of a multicast tree. The control is required to enable network service providers to ensure a committed service level in a differentiated services network, while permitting the multicast tree to dynamically respond to access demand within a framework of a service level agreement (SLA) between the service provider and one or more customers that contract for the multicast service.

SUMMARY OF THE INVENTION

It is an object of the invention to provide a method and apparatus for controlling fanout at an ingress node of a dynamic multicast tree in a differentiated services network.

A first aspect of the invention therefore provides a method of controlling fanout at an ingress node of a dynamic multicast tree for a multicast session in a differentiated services network. The method is commenced when a graft request message is received from an egress node that has not been joined to the multicast tree. On receipt of the graft request message, the provider egress router sends a graft-request message to the ingress node. A determination is then made as to whether a number of egress points specified by a service level specification (SLS) associated with the multicast session permits the egress node to be grafted. If the graft is permitted, a graft permission response message is sent to the egress node. A graft is allowed if the current number of egress points at the ingress is less than a maximum number stipulated by the SLS.

If the egress mode is not permitted to be grafted, a graft-redirect message is preferably sent from the egress node to a downstream requesting node to permit the downstream requesting node to attempt to graft to an existing branch of the multicast tree instead The graft-redirect message contains addresses of at least one grafted egress node that is already a part of the multicast tree, each grafted egress node providing an alternate site at which the downstream requesting node can attempt to graft to the multicast tree. The downstream requesting node forwards a graft request message to each of the grafted egress nodes in an order in which the addresses are presented in the graft-redirect message, and the downstream requesting node grafts to a first of the grafted egress nodes that accepts the graft. The downstream requesting node sends only one graft request message at a time and waits for a response from the grafted egress node to which the graft request message was sent before sending a next message. If each of the grafted egress nodes refuse to permit the downstream requesting node to graft, the graft attempt is aborted.

In accordance with a further aspect of the invention, a Service Level Specification (SLS) associated with the multicast session may include two or more limits for the number of egress points that may be grafted to an ingress node in a multicast tree. Preferably, a service level is associated with each limit so that service is demoted each time the number of egress points exceeds a limit. Preferably, the SLS specifies a first service level when a number of grafted egress nodes is less than or equal to the first limit, and specifies a second service level if the number of grafted egress nodes is greater than or equal to the second limit, etc. The provider ingress node marks packets associated with the multicast session with the service level corresponding to the current limit.

Messages related to the control of fanout at the ingress node of the multicast tree are preferably diverted to a resource management entity resident in the provider ingress node. The resource management entity is an appropriately modified version of Resource Reservation Protocol (RSVP) or Constrained Routing-Label Distribution Protocol (CR-LDP).

The invention also provides an apparatus for controlling fanout at an ingress node of a dynamic multicast tree for a multicast session in a differentiated services network. The apparatus comprises a resource management entity resident in an ingress node of the dynamic multicast tree. The resource management entity is adapted to store at least one variable, the variable defining a maximum number of egress points that may be grafted to the ingress node. It is also adapted to accept graft request messages from egress nodes requesting to be grafted to the multicast tree. It determines whether a graft requested is to be permitted, given a value variable and a number of pre-existing egress points at the ingress node. The resource management entity is also provided in each provider egress node, and in the provider egress nodes it is adapted to formulate a graft-redirect message that is sent to a downstream requesting node if the egress node cannot be grafted to the ingress node. The graft-redirect message formulated by the resource management entity of the provider egress node contains addresses of at least one egress node that is already grafted to the multicast tree. The address preferably points to an egress node that is proximate the downstream node requesting to be grafted.

The differentiated services network preferably includes a relational database which stores a map of all provider egress nodes involved in a multicast tree. The database is used to select addresses for inclusion in the graft-redirect messages.

The invention also provides a system for controlling fanout at an ingress node of a dynamic multicast tree for a multicast session in a differentiated services network. The system includes a plurality of edge nodes in the differentiated services network, one of the edge nodes being the ingress node. Each of the edge nodes include a respective resource management entity adapted to formulate, send and receive signaling messages related to the management of resources required for the multicast tree. The resource management entities of the edge nodes are also adapted to store at least one variable respecting a maximum number of egress points that may be grafted to the ingress node for the multicast tree. The ingress node is further adapted to receive a graft request message from another edge node in the differentiated services network requesting that the other edge node be permitted to graft to the ingress node of the multicast tree. The ingress node is adapted to determine, using the at least one variable respecting a maximum number of egress points, whether the other edge node can be grafted, and to respond to the other edge node with a response message to inform the other edge node whether it can be grafted to the ingress node. The resource management entity of the ingress node is also adapted to store a service level indicator associated with each of the limits, the service level indicators being used to mark data packets associated with the multicast session. When an edge node in the differentiated services network receives a permission to graft to the multicast tree, the resource management entity of the edge node is adapted to provision service resources for the branch of the multicast tree hop-by-hop as a path for the branch is set up by the resource management entity of the edge node.

The invention also provides a resource management entity for an edge node in a differentiated services network adapted to support dynamic multicast groups. The resource management entity comprises means for storing at least one variable for defining a maximum number of egress points that may be grafted to the edge router when the edge router serves as an ingress node of a multicast tree for a dynamic multicast session. It further comprises means for receiving a graft request message from another node in the differentiated services network, the graft request message requesting permission to graft as a new egress point to the ingress node. It further comprises means for determining whether the graft can be accepted using the at least one variable for defining a maximum number of egress points, and means for informing the other node respecting whether the graft can be accepted.

The invention therefore provides a method and apparatus for automatically controlling fanout at an ingress node in a dynamic multicast tree which enables true dynamic control to permit service to be provided within the bounds of a service level agreement governing the multicast session.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

This invention relates to controlling fanout at an ingress node of a dynamic multicast tree.

Figure 1:
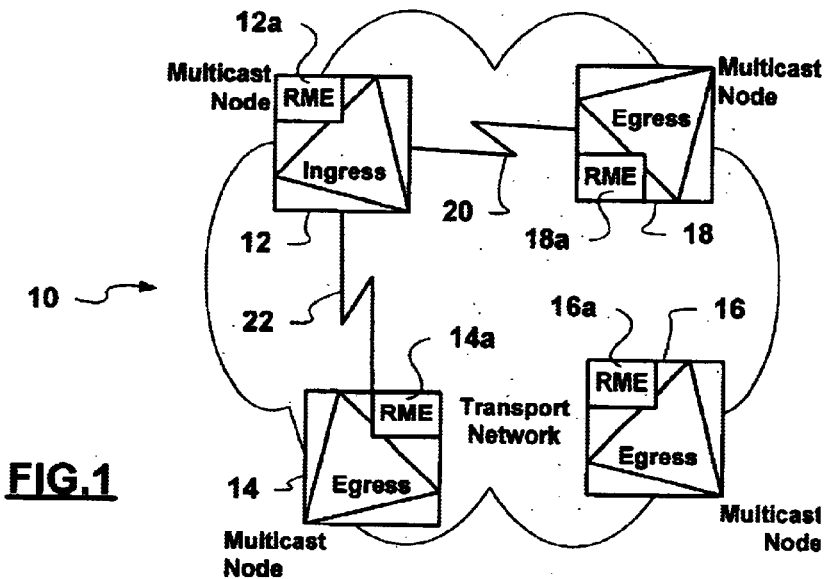
FIG. 1. is a schematic diagram of a service provider domain in a differentiated services network, showing an ingress node and two egress nodes in a very simple dynamic multicast tree.

FIG. 1 is a schematic diagram of a service provider domain 10 of a differentiated services network. As is well understood in the art, the service provider domain includes a plurality of network nodes, only four of which, 12–18, are shown. The nodes in the service provider domain 10 are interconnected by links (not shown) of varying capacity. As is also well understood, the service provider domain 10 includes a plurality of other nodes which are not shown.

In the service provider domain 10 shown in FIG. 1, a dynamic multicast tree which includes three nodes is illustrated. The multicast tree includes an ingress node 12 which receives multicast content from a content source (not illustrated) such as a server of a content provider (not illustrated). The ingress node 12 is connected by a first branch 20 of the dynamic multicast tree to an egress node 18 and by a second branch 22 of the dynamic multicast tree to another egress node 14. As will be well understood by those skilled in the art, the branches 20, 22 of the multicast tree may traverse a plurality of nodes which are not illustrated in FIG. 1.

In a differentiated service network, network service providers provide various levels of service guaranteed by, for example, a service level agreement (SLA) which includes a service level specification (SLS) that specifies a level of service to be provided for a communication such as a dynamic multicast differentiated services session. An SLS may include a plurality of service specifications that govern the delivery of service. The SLS defines the minimum specifications which the service provider is expected to meet in order to satisfy a contractual obligation with the customer. Consequently, in a differentiated service network, it is important for network service providers to be able to control service delivery to ensure that service specifications are met.

Figure 2:
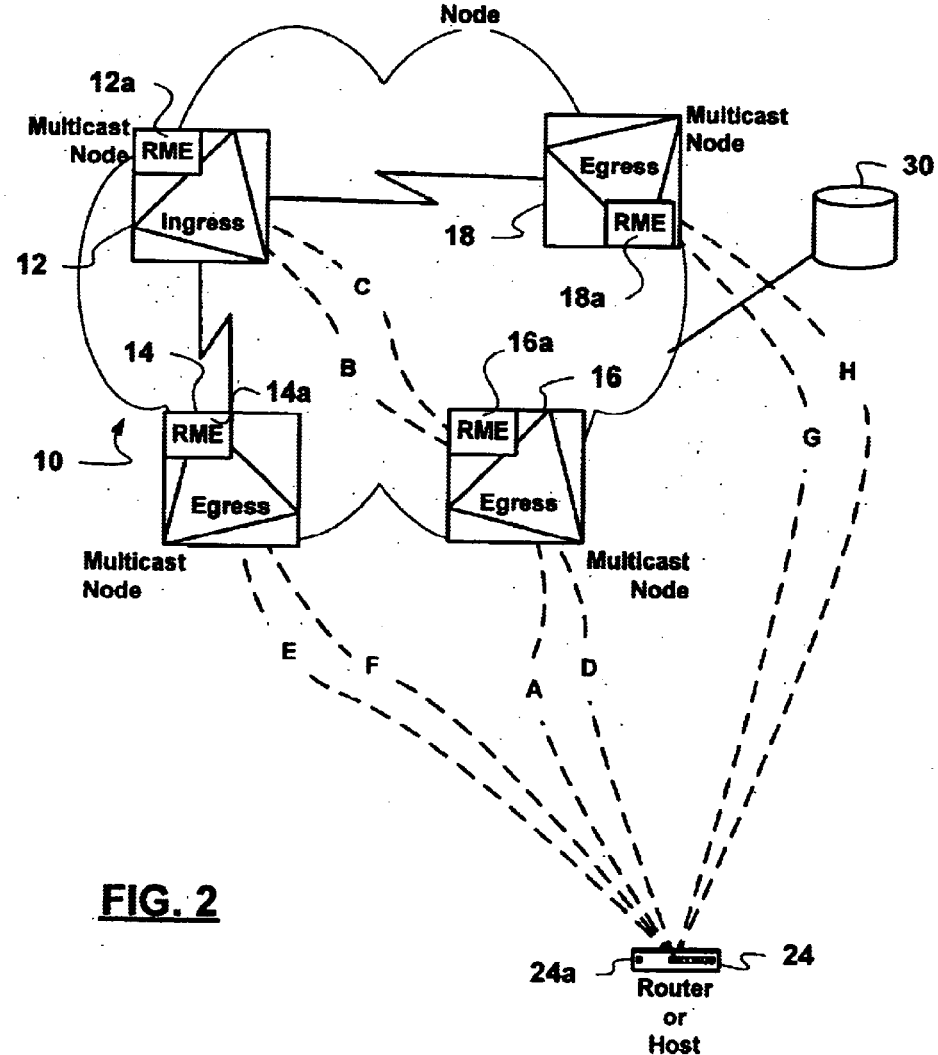
FIG. 2 is a schematic diagram of the service provider domain shown in FIG. 1 and a series of messages sent when a downstream requesting node attempts to graft to the multicast tree.

FIG. 2 schematically illustrates a message exchange between a downstream requesting node and nodes of the service provider network 10 when the downstream requesting node attempts to graft to the dynamic multicast tree in FIG. 1. In FIG. 2, the downstream requesting node, for example router or a host 24, attempts to graft to dynamic multicast tree shown in FIG. 1. As will be explained below in detail with reference to FIGS. 3 and 4, the router 24 exchanges a series of messages with egress nodes 16, 14 and 18 in an attempt to graft to the multicast tree. As will also be explained below in more detail, the methods and apparatus in accordance with the invention control the graft so that the specifications which govern the service provided in the service provider domain 10 satisfy a service agreement respecting the dynamic multicast tree.

Figure 3:
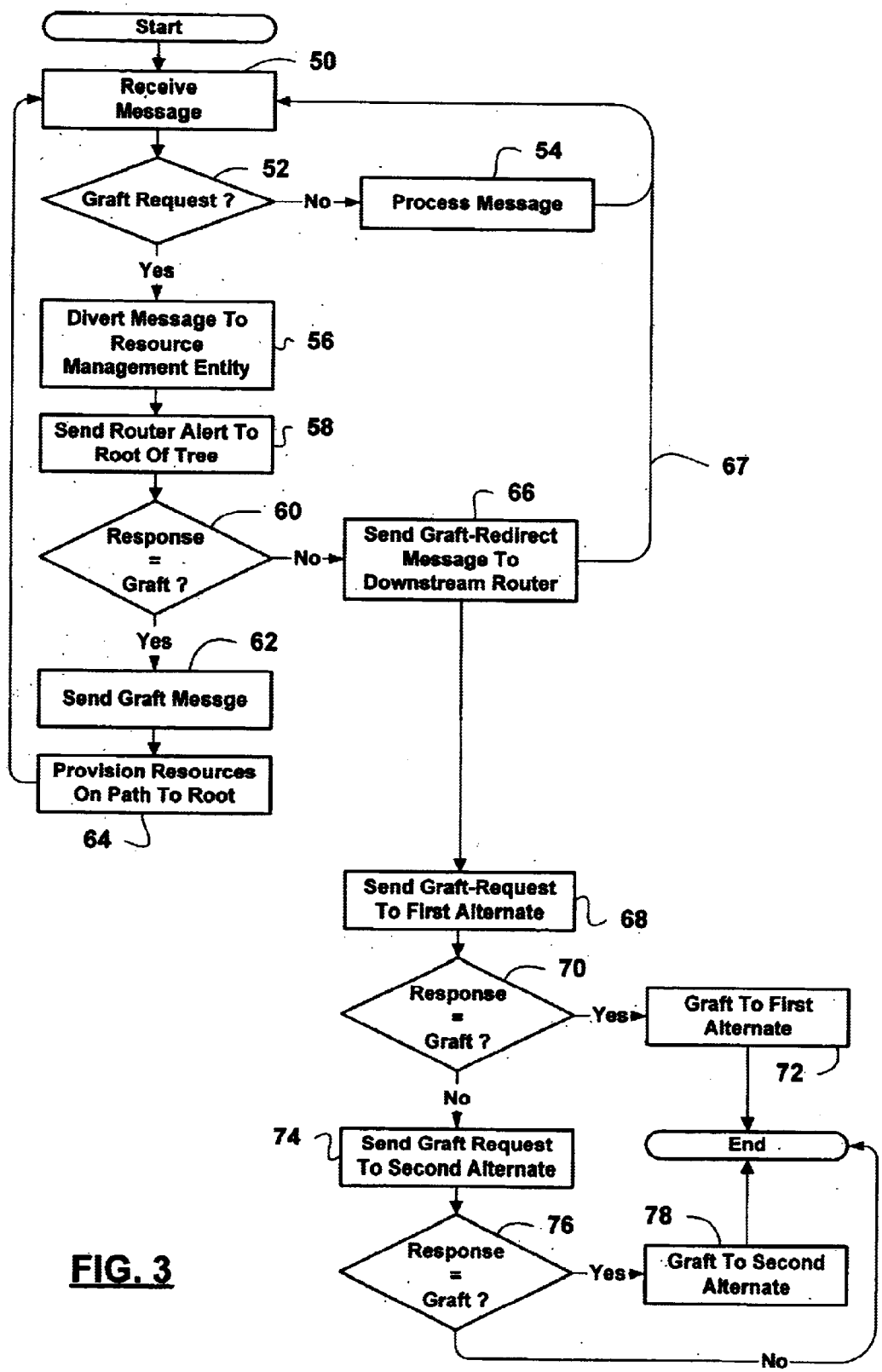
FIG. 3 is a flow diagram of a process executed by an egress node shown in FIG. 2 when the egress node attempts to graft to the multicast tree.
Figure 4:
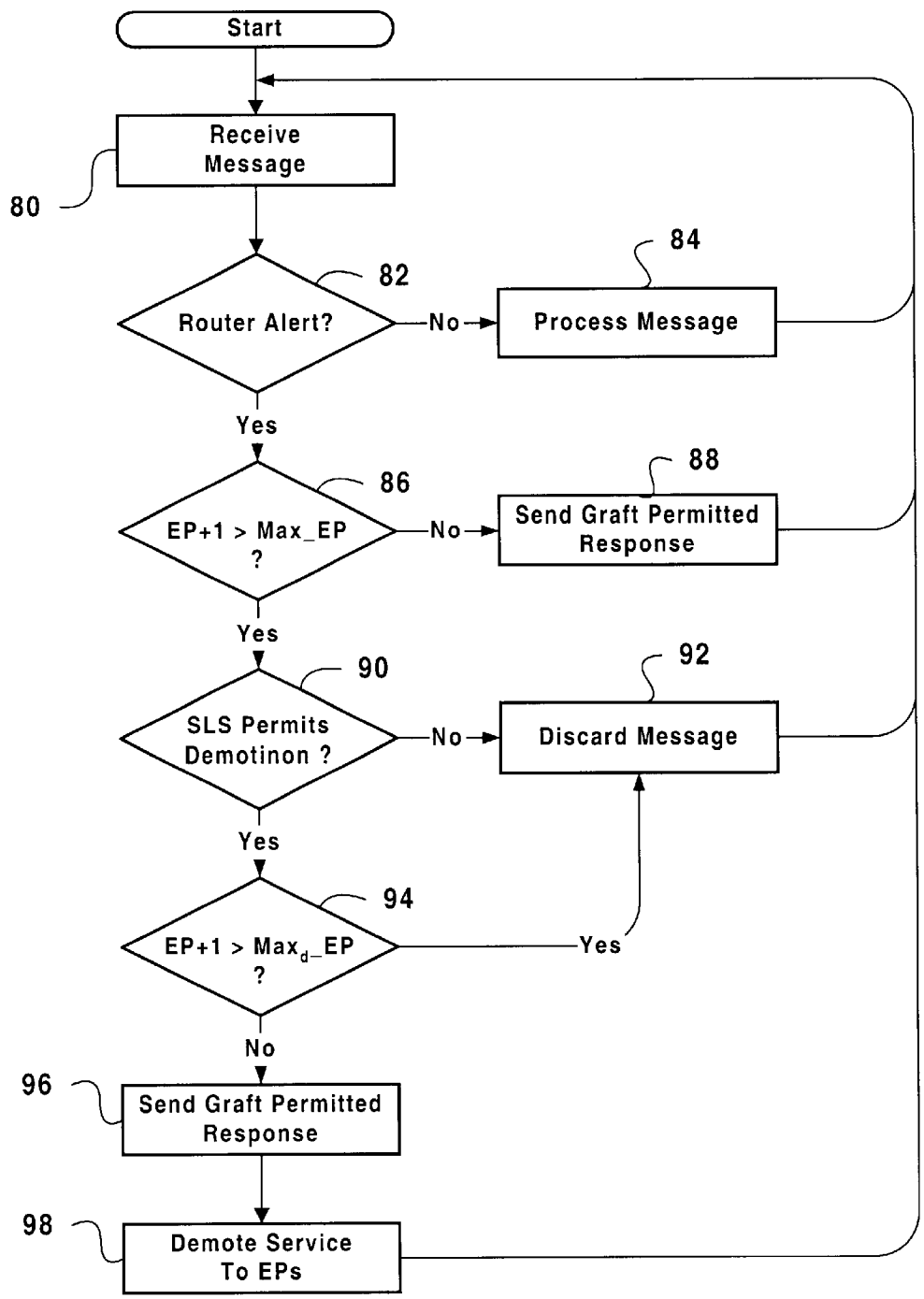
FIG. 4 is a flow diagram of a process executed by an ingress node shown in FIG. 2 when the egress node attempts to graft to the multicast tree.

The invention will now be explained with reference to FIGS. 3 and 4. FIG. 3 is a flow diagram of a first portion of a process followed by the egress node 16 and the downstream requesting node 24 when the downstream requesting node 24 attempts to join the dynamic multicast tree shown in FIG. 2. FIG. 4 is a flow diagram illustrating another portion of the process executed at the same time by the ingress node 12. The processes shown in FIG. 3 proceed as follows:

50. The egress node 16 receives signaling messages (message A, FIG. 2) which may include graft request messages or any other network signaling control message addressed to the egress node 16.

52. Each message is examined to determine whether it is a graft request message.

54. If the message is not a graft request message, the message is processed in accordance with a protocol to which the message relates.

56. If the message is a graft request message, the message is diverted to a resource management entity (RME) 16a (FIG. 2) in a process described in Applicant' copending patent application incorporated herein by reference. The RME is preferably realized as a modified version of Resource Reservation Protocol (RSVP) or Constrained Routing Label Distribution Protocol (CR-LDP) which functions to allocate resources along a path for a branch of a multicast tree.

58. The RME 16a examines the message and determines that the downstream requesting node 24 is requesting a graft to the dynamic multicast tree. Since the egress node 16 is not currently grafted to a branch of the tree, it must formulate a graft request message to request that it be grafted as a new egress point to the ingress node 12. The RME 16a forwards the graft request message (message B, FIG. 2) to the root of the multicast tree to determine whether a graft will be permitted. In accordance with the invention, the message is preferably sent as a router alert message, which is well known in the art, and is an indication to every router on the path towards the root, including node 12, to look at the message. As is well understood in the art, the egress node 16 has knowledge of the address of the root of the multicast tree because that information was provided to the router together with the graft message or was broadcast to all nodes in the network prior to, or concurrently with, a commencement of the multicast session. Consequently, the RME 16a of egress node 16 is enabled to send the router alert message towards the ingress node 12. The ingress node 12 receives the router alert message and responds to it (message C, FIG. 2) in accordance with the invention, as will be explained below with reference to FIG. 4.

60. The egress node 16 receives the response from the ingress node 12 and the RME 16a of the egress node 16 examines the response to determine whether the graft is permitted.

62. If the graft is permitted, a graft message is formulated by the RME 16a and sent from the egress node 16 to the ingress node 12.

64. The egress node 16 begins a process of setting up a path for the branch of the multicast tree in a backwards direction from itself to the ingress node 12 and provisions resources in a hop-by-hop process on the path to the ingress node 12, in accordance with the methods described in detail in Applicant'copending patent application.

66. If the ingress node 12 refuses the graft of the egress node 16 in order to adhere to a service level specification of the dynamic multicast session, the RME of the egress node 16 in accordance with the invention optionally sends a graft-redirect message (message D, FIG. 2) to the downstream requesting node 24. The graft-redirect message preferably contains an address of at least one alternate egress node, for example egress node 14, already grafted to a branch of the dynamic multicast tree. The RME node 16a formulates the graft-redirect message by searching a database 30 (FIG. 2) that provides a map of nodes currently involved in the dynamic multicast tree. Using an algorithm known in the art, the RME 16a of the egress node 16 selects one or more, preferably two or more, alternate graft nodes and sends the addresses of the alternate graft nodes in a graft-redirect message to the downstream router 24 which is attempting to graft to the dynamic multicast tree. A graft-redirect message should only be sent to a router since a node which does not route (a host, for example) can only send to one interface/port. The addresses included in the graft-redirect message are preferably extracted by the egress node 16 from the database 30 which stores the map of the nodes currently grafted to the dynamic multicast tree. The database 30 may be located in any location accessible by the egress nodes 12–18 in the differentiated service network.

67. After the graft-redirect message is sent to the downstream requesting node 24, the egress node returns to its received message mode in step 50.

68. On receipt of the graft-redirect message, the RME 24a of the downstream requesting node 24 extracts a first alternate address from the message and sends a graft message (message E., FIG. 2) to the first alternate egress node 14 which is already grafted to the dynamic multicast tree.

70. If the new graft message is sent via another DS network the grafting of node 24 to node 14 will be subject to the steps from step 50 onwards, with node 14 assuming the role of an ingress node and router 24 the role of an egress node. Otherwise router 24 is grafted to node 14.

74–78. If the response to the graft request in step 70 is a denial of the graft, the graft-redirect message is examined for a second alternate address and, if a second alternate address is included in the message, a graft message (message G, FIG. 2) is sent to the second alternate egress node 18 which is likewise already grafted to the dynamic multicast tree. The steps from 70–72 are then repeated.

If the second graft attempt from router 24 to egress 18 fails, the graft attempt is aborted.

FIG. 4 shows the corresponding process at the ingress node 12. The corresponding process proceeds as follows:

80. The ingress node 12 receives signaling messages at its signaling processor.

82. Each message is processed to determine its message type. If the message is a router alert relating to a graft request sent by an egress node (message B, FIG. 2), the message is diverted to the RME 12a.

84. If the message is not a router alert relating to a graft request, the message is processed in accordance with its type, contents and protocol to which the message relates.

86. On receipt of the router alert message relating to a graft request, the ingress node 12 determines whether the addition of another egress point exceeds a maximum number of egress points dictated by a service level specification (SLS) related to the multicast session. This can be facilitated by maintaining a variable in memory (EP) which stores the current number of egress points from the ingress node 12. Another variable (Max_EP) stores the maximum number of egress points permitted by the SLS. A simple computation then determines whether the grafting of another egress point is permitted.

88. If the number of egress points is not greater than the maximum number permitted by the SLS, a graft permitted response (message C, FIG. 2) is sent to the egress node 16.

90. In accordance with the invention, the resource management entity of the ingress node 12 may be programmed to permit more than the maximum number of egress points enabled by the SLS if a service level contracted for the multicast session is permitted to be demoted to enable the extra throughput without consuming more than the committed resources. Consequently, data in the SLS is examined to determine whether service demotion is permitted.

92. If service demotion is not permitted, the router alert message is discarded. If a response is not received to the router alert message sent by the egress node 16 (message B, FIG. 2), the egress node 16 will time out and the graft attempt will be aborted.

94. If it is determined in step 90 that the SLS permits service demotion, a second computation is performed to determine whether the number of egress points will exceed a second limit ($Max_d\_EP$) if another egress point is added to the ingress router 12.

96. If the addition of another egress point does not exceed the second limit, a graft permitted response message is returned to the egress node 16.

A corresponding demotion of the service level may be applied in order to keep resource usage within the terms of the SLS. The methods and apparatus in accordance with the invention therefore control fanout at the ingress node 12; while ensuring that a downstream requesting node 24 is grafted to the dynamic multicast tree whenever committed resources in the DS network permit the graft to occur without degrading the multicast service below a limit specified by an SLS for the multicast session. As will be understood by those skilled in the art, although only a first and second limit on the number of egress points were described with reference to FIG. 4, more than a first and second limit could be implemented, depending on the initial service level contracted in the SLA and the number of service levels offered by the network service provider 10 (FIG. 1).

As will also be understood by those skilled in the art, although a very simple multicast tree was described in the example presented above with respect to FIGS. 2–4 for the sake of clarity, dynamic multicast trees are frequently complex structures which involve hundreds of nodes. Regardless of the complexity of the tree, the methods and apparatus in accordance with the invention enable control of fanout at ingress nodes to ensure that contracted service levels are met.

The embodiments of the invention described above are intended to be exemplary only. The scope of the invention is therefore intended to be limited solely by the scope of the appended claims.

We claim:

1. A method of controlling fanout at an ingress node of a dynamic multicast tree for a multicast session in a differentiated services (DS) network, comprising the steps of:
   a) receiving a graft request message from an egress node that has not been joined to the multicast tree;
   b) determining whether a number of egress points specified by a service level specification (SLS) associated with the multicast session permits the egress node to be grafted;
   c) if the graft is permitted, sending a graft permission response message to the egress node; and if graft is not permitted a graft-redirect message is sent from the egress node to a downstream requesting node to permit the downstream requesting node to attempt to graft to an existing branch of the multicast tree.

2. A method as claimed in claim 1 wherein the graft-redirect message contains addresses of at least one grafted egress node that is already a part of the multicast tree, each grafted egress node providing an alternate site at which the downstream requesting node can attempt to graft to the multicast tree.

3. A method as claimed in claim 2 wherein the downstream requesting node forwards a graft request message to each of the at least one grafted egress nodes, in an order in which the addresses are presented in the graft-redirect message, and the downstream requesting node grafts to a first of the grafted egress node that accepts the graft.

4. A method as claimed in claim 3 wherein the downstream requesting node sends only one graft request message at a time and waits for a response from the grafted egress node to which the graft request message was sent before sending a next message.

5. A method as claimed in claim 4 wherein if each of the grafted egress nodes refuses to permit the downstream requesting node to graft, the graft attempt is aborted.

6. A method as claimed in claim 1 wherein in step (b) a graft permitted response message is sent from the ingress node if a number of egress points at the ingress is less than a maximum number permitted by the SLS.

7. A method as claimed in claim 1 wherein the SLS specifies a first service level when a number of grafted egress nodes is less than or equal to a first limit, and specifies a second service level if the number of grafted egress nodes is greater than the first limit.

8. A method as claimed in claim 7 wherein the ingress node marks packets associated with the multicast session with the first service level when the number of grafted egress nodes is less than or equal to the first limit.

9. A method as claimed in claim 8 wherein the ingress node marks packets associated with the multicast session with the second service level when the number of grafted egress nodes is greater than the first limit, thereby demoting the service level at the ingress node when the number of grafted egress nodes subtending the ingress node exceeds the first limit.

10. A method as claimed in claim 1 wherein the graft request message sent from the egress node is a router alert message.

11. A method as claimed in claim 1 wherein prior to sending the graft request message to the ingress node, the egress node receives a graft message from a downstream node wishing to graft to the multicast tree, and the graft message is diverted to a resource management entity resident in the egress node.

12. A method as claimed in claim 11 wherein the resource management entity sends a router alert towards the root of the multicast tree and this message is intercepted by an ingress node.

13. A methods as claimed in claim 12 wherein if the ingress node permits the graft, the resource management entity of the egress node provisions resources as a path for the multicast tree is set up to the ingress node.

14. A method as claimed in claim 1 wherein if a new egress node is added to the multicast tree, the new egress node requests a resource allocation along existing paths of the multicast tree; in a hop-by-hop process.

15. An apparatus for controlling fanout at an ingress node of a dynamic multicast tree for a multicast session in a differentiated services network, comprising;
   a resource management entity resident in an ingress node of the dynamic multicast tree, the resource management entity is programed to receive a service level specification (SLS) that specifies a level of service to be provided for the multicast session, and to store in a memory at least one variable defining a maximum number of egress points that may be grafted to the ingress node as specified by the SLS, and further adapted to accept graft request messages from egress nodes requesting to be grafted to the multicast tree, and to determine whether a graft requested in a graft request message is to be permitted given a value of the at least one variable and a number of pre-existing egress points at the ingress node, and the resource management entity in each egress node is further programmed to formulate a graft-redirect message that is sent to a downstream requesting node if the egress node cannot be grafted to the ingress node.

16. Apparatus as claimed in claim 15 wherein the redirect message formulated by the resource management entity of the egress node contains addresses of at least one grafted egress node that is already grafted to the multicast tree.

17. Apparatus as claimed in claim 16 wherein the at least one address is retrieved from a memory based on a relationship between the grafted egress node and the downstream node requesting to be grafted.

18. Apparatus as claimed in claim 17 wherein the relationship between the grafted egress nodes and the downstream node requesting to be grafted can be one of proximity, the at least one grafted egress node being a grafted egress node most proximate the downstream node requesting to be grafted.

19. Apparatus as claimed in claim 18 wherein the address of the at least one grafted egress node is stored in a memory.

20. Apparatus as claimed in claim 19 wherein the memory is a database resident on a server accessed by the resource management entity of the egress node.

21. Apparatus as claimed in claim 15 wherein the resource management entity is further programmed to store in the memory at least two variables defining at least first and second limits respecting a maximum number of egress points that may be grafted to the ingress node, and further adapted to store in the memory a service level associated with each of the at least first and second limits.

22. Apparatus as claimed in claim 21 wherein the ingress node is adapted to mark data packets associated with the multicast tree with a service level indicator that determines a quality of service for the data packets as they traverse the multicast tree.

23. Apparatus as claimed in claim 22 wherein the service level indicator with which the packets are marked is determined by the number of egress points from the ingress node, which is compared with each of the at least first and second limits to determine the service level indicator with which the data packets should be marked.

24. A system for controlling fanout at an ingress node of a dynamic multicast tree for a multicast session in a differentiated services network, comprising:

a plurality of edge nodes in the differentiated services network a selected one of the edge nodes being the ingress node, each of the edge nodes including a respective resource management entity programed to formulate, send and receive signaling messages related to the management of resources required for the multicast tree; and the resource management entities of the edge nodes being further adapted to receive a service level specification (SLS) that specifies a level of service to be provided for the multicast session, and to store in a memory at least one variable respecting a maximum number of egress points that may be grafted to the ingress node for the multicast tree; and if the ingress node cannot accept a graft request from another edge node in the differentiated services network, the resource management entity of the other edge node is programmed to send a graft-redirect message to a downstream requesting node to provide the downstream requesting node with an address of at least one egress node already grafted to the multicast tree.

25. The system as claimed in claim 24 wherein the ingress node is programed to receive a graft request message from another edge node in the differentiated services network requesting that the other edge node be permitted to graft to the ingress node of the multicast tree.

26. The system as claimed in claim 24 wherein the resource management entity of the ingress node is programed to determine, using the at least one variable respecting a maximum number of egress points, whether the other edge node can be grafted, and to respond to the other edge node with a response message to inform the other edge node whether it can be grafted to the ingress node.

27. The system as claimed in claim 26 wherein the resource management entity of the ingress node is programed to store at least two variables respecting the maximum number of egress points, the at least two variables providing at least first and second limits respecting the number of egress points that can be grafted to the edge node.

28. The system as claimed in claim 27 wherein the resource management entity of the ingress node is programmed to store in the memory at least two service level indicators respectively associated with each of the at least first and second limits, the service level indicators being used to mark data packets associated with the multicast session.

29. The system as claimed in claim 24 wherein the differentiated services network further includes a database that stores a map of the nodes in the network, the map providing an address of each node.

30. The system as claimed in claim 24 wherein the at least one address of the egress node already grafted to the multicast tree may be selected from the database on the basis of a proximity to the downstream requesting node to the edge node in the differentiated services network.

31. The system as claimed in claim 24 wherein when an edge node in the differentiated services network receives a permission to graft to the multicast tree, the resource management entity of the edge node provisions service resources as a path for the branch of the multicast tree.

32. A resource management entity for an edge node in a differentiated services network adapted to support dynamic multicast groups, comprising:

means for accepting a service level specification (SLS) that specifies a level of service for a multicast session and at least one variable for defining a maximum number of egress points that may be grafted to the edge router when the edge node serves as an ingress node of a multicast tree for a dynamic multicast session;

means for storing the at least one variable in a memory;

means for receiving a graft request message from another node in the differentiated services network, the graft request message requesting permission to graft as a new egress point to the ingress node;

means for determining whether the graft can be using the at least one variable for defining a maximum number of egress points;

means for informing the other node respecting whether the graft can be accepted; and means for sending a graft-redirect message to a downstream requesting node when it is determined that the graft cannot be accepted, the graft-redirect message containing an address of at least one node already grafted to the multicast tree.

33. A resource management entity as claimed in claim 32 further including means for storing in the memory a service level indicator associated with each of the at least one variable, the service level indicator being used to mark data packets associated with the multicast session.

34. A resource management entity as claimed in claim 32 further including means for retrieving from a database the address of the at least one grafted node, the address being selected on a basis of proximity of the grafted node to the downstream requesting node.

35. A resource management entity as claimed in claim 32 further including means for dynamically provisioning resources as a path for branch of the multicast tree.

* * * * *